No. 624,819. Patented May 9, 1899.
T. S. JONES.
MEASURING DEVICE.
(Application filed Apr. 13, 1898.)
(No Model.)
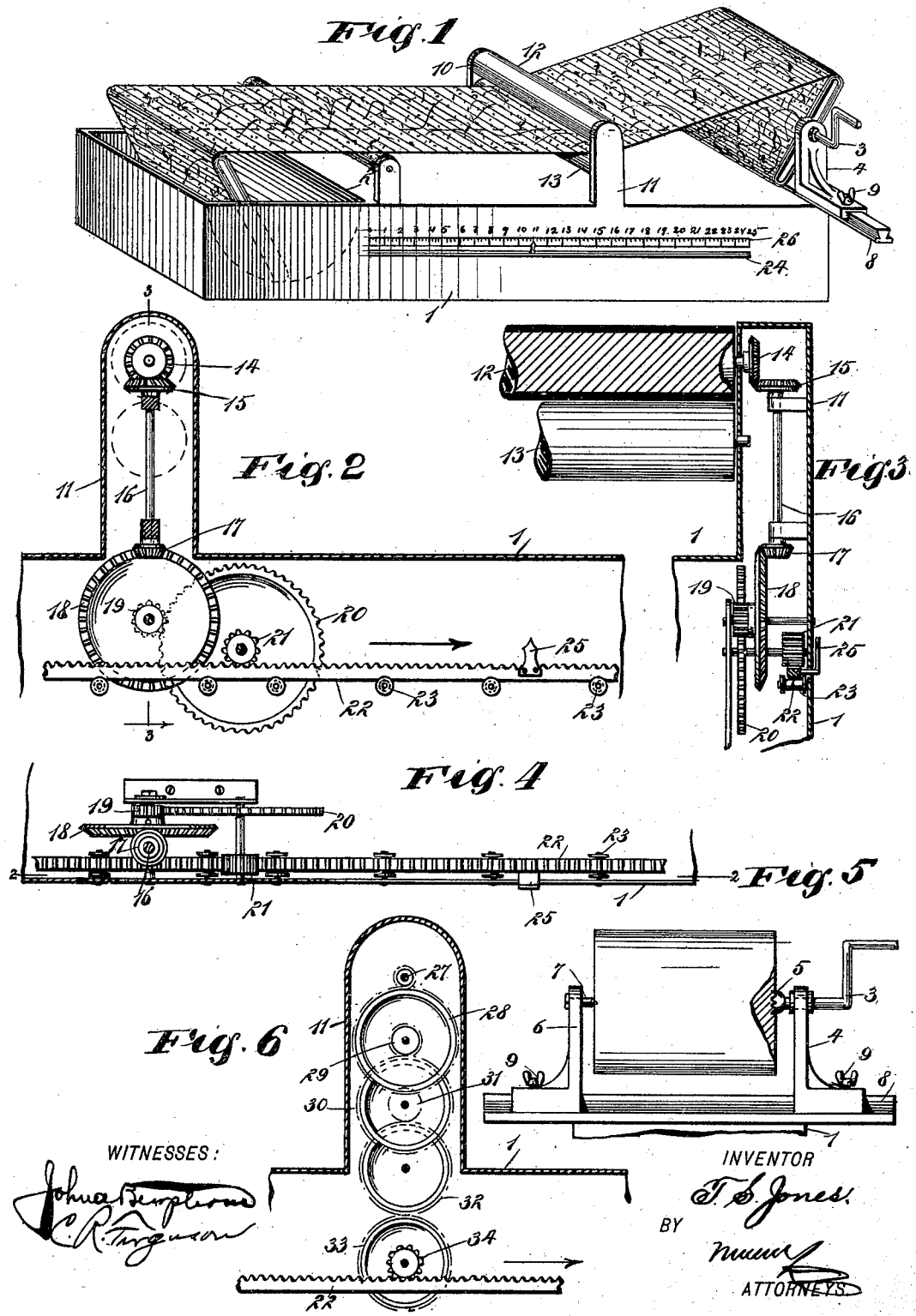

UNITED STATES PATENT OFFICE.

THOMAS SETON JONES, OF PRINCE ALBERT, CANADA, ASSIGNOR OF ONE-HALF TO JOHN JAMES STEWART, OF SAME PLACE.

MEASURING DEVICE.

SPECIFICATION forming part of Letters Patent No. 624,819, dated May 9, 1899.

Application filed April 13, 1898. Serial No. 677,408. (No model.)

*To all whom it may concern:*

Be it known that I, THOMAS SETON JONES, of Prince Albert, Saskatchewan, Northwest Territories, Canada, have invented a new and Improved Measuring Device, of which the following is a full, clear, and exact description.

This invention relates to devices for measuring cloth, ribbons, and the like; and the object is to provide a comparatively simple device by means of which material may be quickly and accurately measured, thus making the machine very useful in factories or in stores during the time of taking account of stock.

I will describe a measuring device embodying my invention and then point out the novel features in the appended claim.

Reference is to be had to the accompanying drawings, forming a part of this specification, in which similar characters of reference indicate corresponding parts in all the views.

Figure 1 is a perspective view of a measuring device embodying my invention. Fig. 2 is a partial section on the line 2 2 of Fig. 4 and a partial elevation showing a gearing employed. Fig. 3 is a section on the line 3 3 of Fig. 2. Fig. 4 is a plan view of the measuring-gearing. Fig. 5 is an end elevation, and Fig. 6 shows a modification.

The measuring device comprises a box-like base 1, having a receptacle 2 at one end for receiving the goods to be measured. At the opposite end is a board-turning device comprising a crank 3, having a bearing through a standard 4 and provided on its inner end with teeth 5 to engage in the end of a board upon which the cloth or other material is to be wound. At the opposite end of the board is a standard 6, having a pin 7, adapted to engage in the end of the board. These standards 4 and 6 are adjustable toward and from each other on a track 8, secured to the base 1. The track 8 is undercut at the sides, and the standards have downwardly-extended flanges which engage against these undercut sides, and the standards may be held as adjusted by means of set-screws 9.

Between the ends of the base 1 are uprights 10 11, in which rollers 12 and 13 are journaled one above the other. These rollers will preferably be covered with a yielding material—such, for instance, as rubber—and one of them may be provided with yielding bearings, so as to engage closely against the cloth or other material being measured. On the shaft of one of the rollers (here shown as the roller 12) is a bevel-pinion 14, meshing with a bevel-pinion 15 on a shaft 16, arranged in the upright 11. On the lower end of the shaft 16 is a pinion 17, meshing with a bevel-gear 18, on the shaft of which is a pinion 19, meshing with a gear-wheel 20, and on the shaft of this gear-wheel 20 is a pinion 21, meshing with a longitudinally-movable rack 22. This rack 22 is arranged within the base 1 and moves on rollers 23 in said base. An arm extends outward from the rack 22 through a slot 24 in the side of the base 1, and to the outer end of this arm a finger 25 is attached. This finger is designed to indicate on a scale 26, marked on the base, the number of yards of material run between the rollers. Owing to the arrangement of the chain of gearing it is obvious that the rack 22 will have a very slow movement.

In operation the cloth to be measured is placed in the receptacle 2. Then one end of the cloth is run between the rollers and attached to a board upon which it is to be wound, as indicated in Fig. 1. Then by turning the crank 3 it is obvious that the cloth will be drawn between the rollers, which will cause them to rotate and move the rack 22, and consequently move the finger or pointer 25 over the scale 26 and indicate the number of yards wound from one board to another.

In Fig. 6 I have shown a different arrangement of gearing from that shown in Fig. 2—that is, on the shaft of the measuring-roller is a pinion 27, meshing with a gear-wheel 28, carrying a pinion 29, which meshes with a gear 30, having a pinion 31, meshing with a gear 32, which engages with a gear 33, carrying a pinion 34, engaging with the rack 22.

Having thus described my invention, I claim as new and desire to secure by Letters Patent—

A cloth-measuring device, comprising a base having a cloth-receptacle at one end and an adjustable winding device at the other end, a pair of rollers having bearings in uprights on the base, a bevel-gear on the shaft of one of said rollers, an upright shaft having a bevel-gear engaging with the first-named bevel-gear, a bevel-pinion on the lower end of said upright shaft, a bevel-gear engaging therewith, a gear-wheel driven from said bevel-gear, a rack driven from the gear-wheel, a pointer carried by said rack, and a yard-scale on the base over which said pointer is movable, substantially as specified.

THOMAS SETON JONES.

Witnesses:
JAS. MCKAY,
H. E. ROSS.